Figure 1:
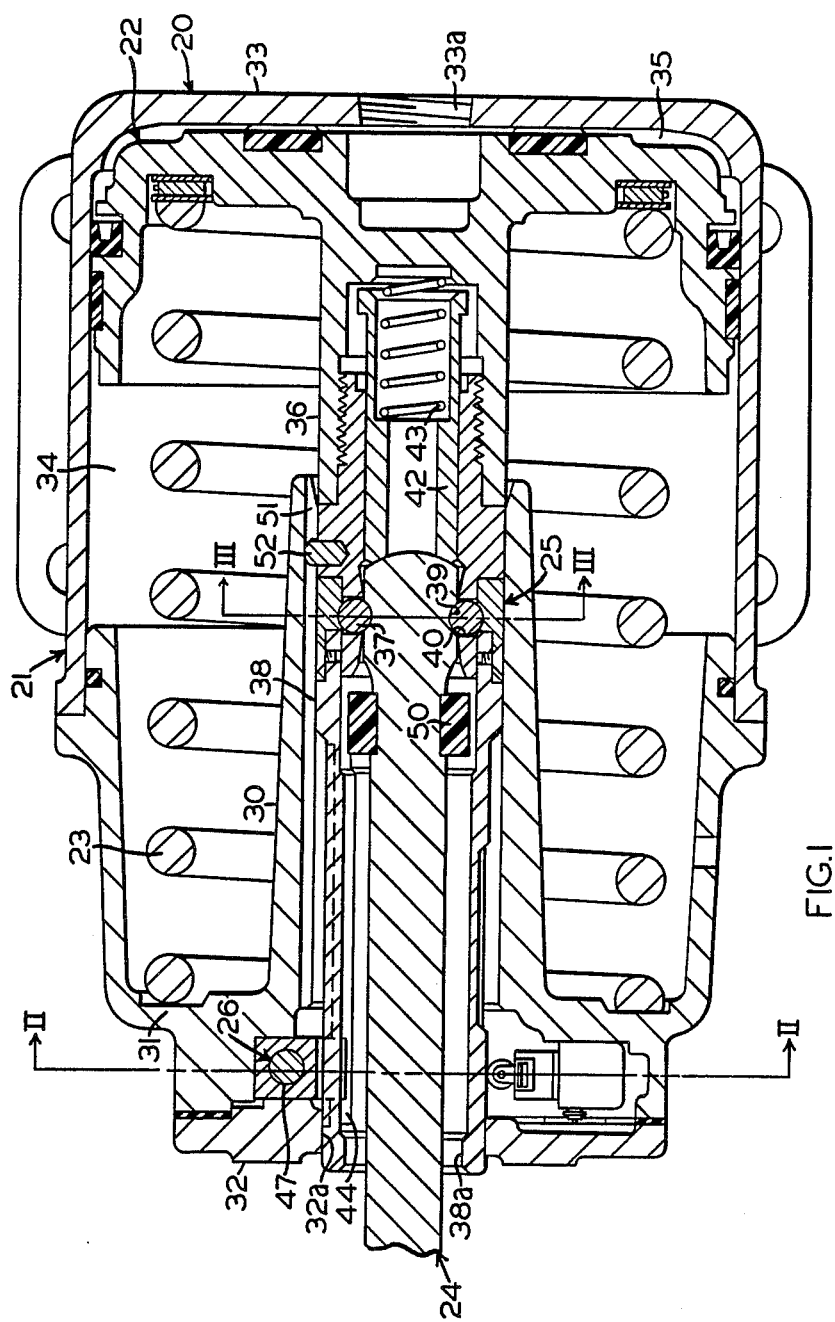

United States Patent [19]

Hata et al.

[11] Patent Number: 4,781,105
[45] Date of Patent: Nov. 1, 1988

[54] SPRING BRAKE CYLINDER

[75] Inventors: Yasuhisa Hata, Akashi; Osamu Akamatsu, Kobe, both of Japan

[73] Assignee: Nippon Air Brake Co., Ltd., Kobe, Japan

[21] Appl. No.: 32,105

[22] Filed: Mar. 27, 1987

[30] Foreign Application Priority Data

Mar. 28, 1986 [JP] Japan .................................. 61-71602

[51] Int. Cl.$^4$ .............................................. F01B 9/00
[52] U.S. Cl. ......................................... 92/29; 92/5 R;
92/21 MR; 92/129; 92/14; 188/265
[58] Field of Search ................. 92/29, 21 MR, 130 R, 92/130 A, 84, 129, 5 R, 5 L, 92, 63, 14; 403/524, 322, 325; 188/265

[56] References Cited

U.S. PATENT DOCUMENTS

| 3,498,188 | 3/1970 | Rodriguez | 92/29 |
| 3,994,206 | 11/1976 | Dahlkvist | 92/29 |
| 4,491,059 | 1/1985 | Martin | 92/5 L |

FOREIGN PATENT DOCUMENTS 288929 6/1953 Switzerland .......................... 92/5 R Primary Examiner—Robert E. Garrett
Assistant Examiner—Thomas Denion
Attorney, Agent, or Firm—J. O. Ray, Jr.

[57] ABSTRACT

A spring brake cylinder assembly having a spring-biased piston positioned therein. A pushrod is engaged with the piston through a clutch, which clutch includes both a clutch control device and a clutch operating mechanism that can manually release a brake application being applied by the assembly.

4 Claims, 3 Drawing Sheets

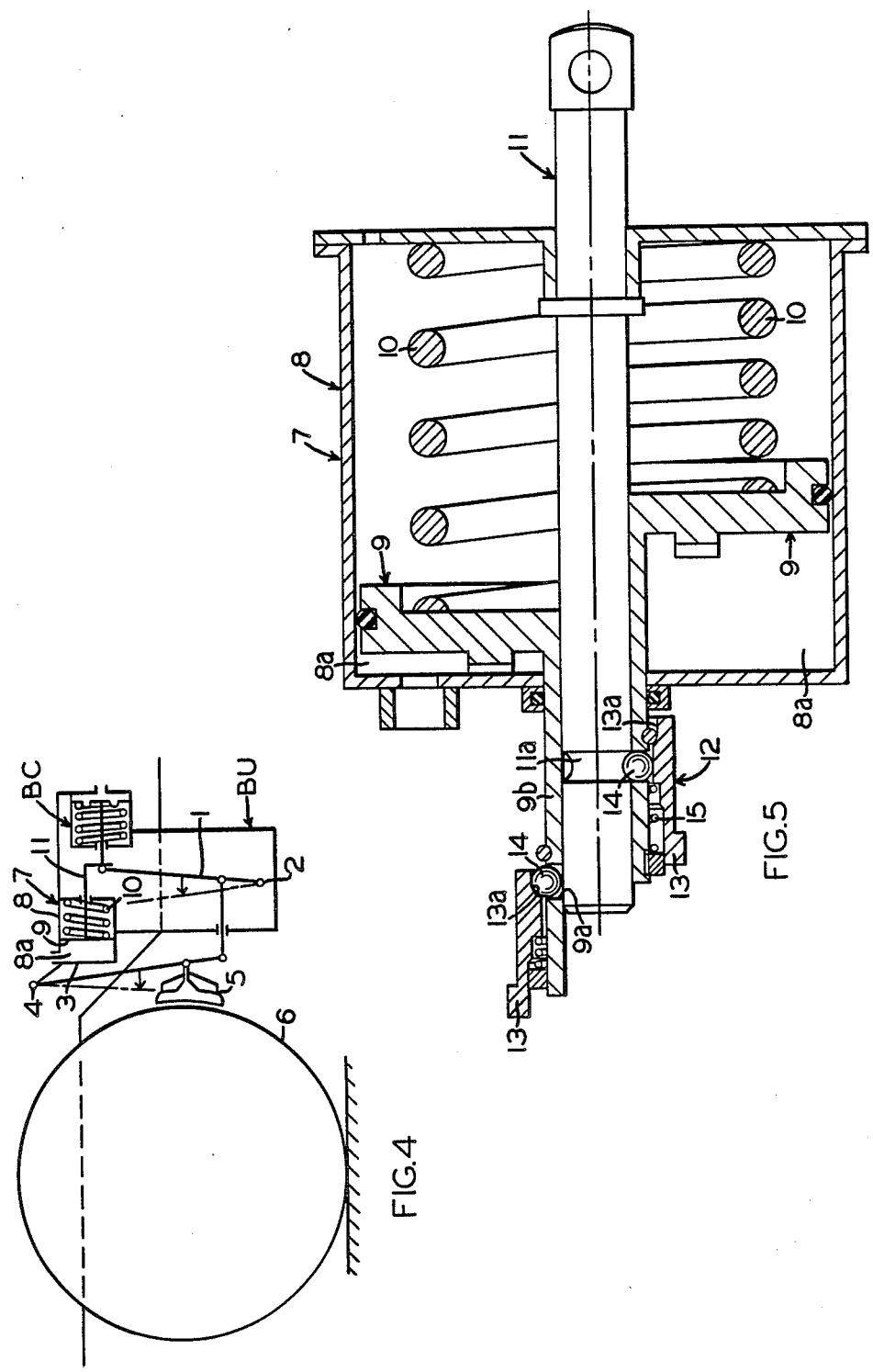

SPRING BRAKE CYLINDER

SCOPE OF PATENT REQUEST

This invention relates to the spring brake cylinder, as disclosed in our Japanese Patent Application No. P61-71602, which is incorporated herein by reference thereto, which is constructed in the following way. A piston housed in a cylinder body divides the interior of the cylinder body into a spring room and a compressed air room. A cylindrical part extends from the center of the piston coaxially with the cylinder body. A spring for spring braking is housed in the spring room and pushes the piston to the compressed air room side. One end of a pushrod is inserted into the inner hole of the aforementioned cylindrical part and it can be connected or disconnected with the piston. The other end extends to the outside of the cylinder body. Balls are held inside the aforementioned cylindrical part, being allowed to move in the radial directions. A control part is a cylinder-shaped body and its inner wall at the one end covers the balls. The other open end reaches the end of the cylinder. While it can be moved along the axis together with the piston, it can also be rotated about the axis. With a certain amount of normal or reverse rotation, the ball position can be controlled. Concaves are cut at the piston side end of the pushrod relating to the balls. Rotational operations are made with an operation part.

In the invented spring brake cylinder, two balls are placed at each end of a certain diameter of the cylindrical part. In this design, the pushrod can be swayed to a certain extent with the above diameter as a pivot while it is connected to the piston with the clutch, taking advantage of the space between the rod and the inner wall of the control part.

FIGURE CAPTIONS

FIG. 1 Side cross sectional view of an example of the installation of the present invention.

Figure 2:
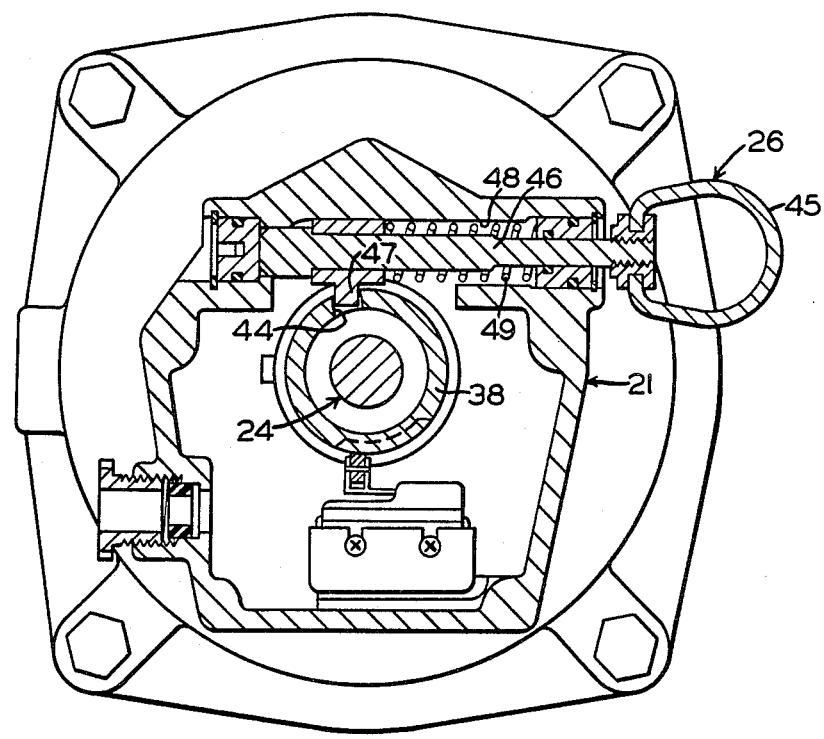

FIG. 2 b—b cross section in FIG. 1.

Figure 3:
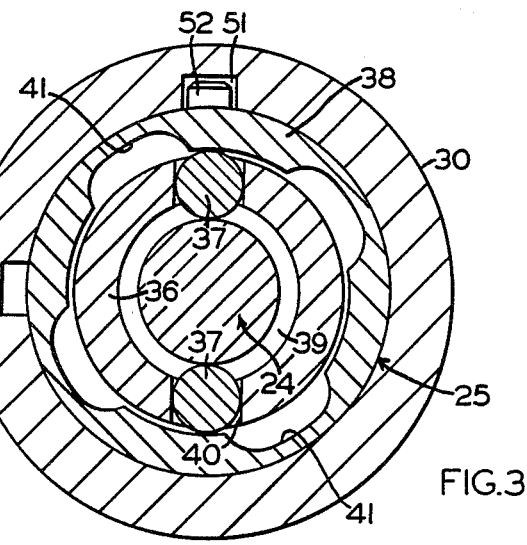

FIG. 3 c—c cross section in FIG. 1.

FIG. 4 Schematic side view showing typical application of a spring brake cylinder. Part of a car and a brake unit is shown.

FIG. 5 Cross sectional side view of a typical conventional brake cylinder. Upper half and bottom half correspond to different states.

20—spring brake cylinder, 21—cylinder body, 22—piston, 23—spring for spring braking, 24—pushrod, 25—clutch, 26—operation part, 34—spring room, 35—compressed air room, 36—cylindrical part, 37—balls, 38—control part, 38a—hole of control part, 39—concaves.

DETAILED EXPLANATION OF THE INVENTION

Industrial Applications

This invention relates to the spring brake cylinder, which is used for railroad cars while in parking, especially the one which allows its manual release and swaying the pushrod for brake power transmission.

Conventional Technology

As shown in FIG. 4, a conventional brake cylinder is used as a part of a brake unit BU or in conjunction with a basic brake unit through a brake lever. In the figure, normal brake operations, when the car is running, takes place as follows. The piston in the brake cylinder BC is pushed by compressed air which is supplied from an air brake control unit which is not shown in the figure. As a result the lever 1 swings with its bottom end as a pivot 2 to the position shown by a single dotted broken line. In conjunction with this, the suspending rod 3 swings to the position shown by a single dotted broken line with its top end as a pivot 4. This causes the brake shoe 5, which is held by the suspending rod 3, to be pressed against the rim 6 causing braking. When the compressed air is evacuated from the brake cylinder BC, the lever 1 and the suspending rod 3 are in the positions shown by solid lines in the figure and the brake is released.

The spring brake cylinder 7 is a separate unit from the brake cylinder BC for the normal brake operations just described. Its typical assembly is shown in FIG. 5. In the figure, 8 indicates a cylinder body, 9 a piston, 10 a spring for spring braking, 11 a pushrod, 12 a clutch, and 13 is a clutch operation part. As shown in FIG. 4, the pushrod 11 of the spring brake cylinder 7 is connected to the lever 1. When the pushrod 11 moves to the left from the position shown in the figure, the condition of being connected to lever 1 causes the lever 1 to swing. The lever 1 alone can swing to the left freely, however. Normal braking operation with the brake cylinder BC is made with the pushrod 11 at the rightmost position as shown in FIG. 4. Here, the spring brake cylinder 7 is not involved in the operation. The state where the pushrod 11 is in the rightmost position is realized by the compressed air in the compressed air room 8a of the spring brake cylinder 7. In this condition, the piston 9 is pressed to the right against the spring 10 and the clutch 12 is connecting the piston 9 and the pushrod 11. This corresponds to the state shown as a bottom half section of FIG. 5.

As mentioned above, the spring brake cylinder 7 is used, for example, to keep the brake set in parking. Its normal state is shown as a bottom half section of FIG. 5. When the compressed air in the compressed air room 8a is evacuated, the spring 10 causes the right end of the pushrod 11 to pull the top end of the lever 1 to the left. This causes the lever 1 to swing and the brake will be applied in just the same way as the brake cylinder BC is activated. Here, the spring in the brake cylinder BC is compressed.

The clutch 12 is installed to release the brake, when it is activated by the spring brake cylinder 7 without using compressed air. As shown in FIG. 5, it intermediates the piston 9 and the pushrod 11 and consists of a channel 11a in the pushrod 11, several balls 14 which relate to the channel 11a, an operation part 13, a spring 15 and others. The balls 14 are held in the holes 9a which are drilled at certain positions of the cylindrical part 9b of the piston 9. The clutch 12 is shown in the engaged state in the bottom half of FIG. 5 and in the disengaged state in the top half of the figure. The clutch 12 is disengaged from its engaged position by moving the operation part 13 along the axis against the spring 15. Because the larger inner diameter part 13a comes to the outside of the balls 14, the clutch 12 is disengaged. In this state, the pushrod 11 does not move to the left, even if the piston 9 is in its leftmost position after the air is exhausted from the compressed air room 8a. Therefore, the spring brake cylinder 7 does not cause braking.

The spring brake cylinder 7 which is equipped with a clutch 12 as shown in FIG. 5 is described in the detailed description of U.S. Pat. No. 3,498,188. Also improved versions exist as U.S. Pat. No. 4,080,875 and U.S. Pat.

No. 4,480,531. However, in all these examples, the pushrod makes translational motion with its center axis being matched with the center axis of the piston.

In the connection of the pushrod 11 to the lever 1 shown in FIG. 4, it is necessary to allow vertical displacements of the rod, because the connected point moves on a circle as the lever 1 swings around a pivot. The design which allows this vertical displacement in a conventional brake cylinder exists as described in the official report, patent 59-110440. However, in this case, the pushrod and the piston are connected with a pin and it lacks a clutch.

Problems this Invention Intends to Solve

The need for a quick manual release mechanism for a spring brake cylinder arises when a railroad car, which is parked with a brake applied with the spring brake cylinder, needs to be moved quickly. On the other hand, it is sometimes necessary that the external end of the pushrod can be swayed as discussed above. One may conceive a combined design of the conventional spring cylinder which is equipped with a clutch to release the spring brake as a quick release mechanism and the design in which the pushrod and the piston is connected with a pin so that the rod may be swayed. However, such a combination will require to replace the pushrod with a compound structure in which the pushrod is supported inside a sheath with a pin. If we design the structure beginning with the necessary diameter of the rod and determining the sizes of other parts accordingly, the outer diameter of the quick release mechanism will become very large. It will inevitably result in much increased construction costs due to the large size and complexities. One may attempt to satisfy the need for the vertical displacement at the external end position of the pushrod in a different method, for example, by a new linkage of the pushrod to the lever 1. This also results in substantial cost increase, however.

The purpose of this invention is to realize a spring brake cylinder with a quick release mechanism of relatively simple design in which the external end of the pushrod can be swayed without increasing the outer diameter.

Methods to Solve the Problem

This invention relates to the spring brake cylinder which is constructed in the following way. A piston housed in a cylinder body divides the interior of the cylinder body into a spring room and a compressed air room. A cylindrical part extends from the center of the piston coaxially with the cylinder body. A spring for braking is housed in the spring room and pushes the piston to the compressed air room side. One end of a pushrod is inserted into the inner hole of the aforementioned cylindrical part and it can be connected or disconnected with the piston. The other end extends to the outside of the cylinder body. Balls are held inside the aforementioned cylindrical part, being allowed to move in the radial directions. A control part is a cylinder-shaped body and its inner wall at the one end covers the balls. The other open end reaches the end of the cylinder. While it can be moved along the axis together with the piston, it can also be rotated about the axis. With a certain amount of normal or reverse rotation, the ball positions can be controlled. Concaves are cut at the piston side end of the pushrod relating to the balls. Rotational operations are made with an operation part.

In this invention following special constructions are made. Two balls are placed at each end of a certain diameter of the cylindrical part. In this design, the pushrod can be swayed to a certain extent with the above diameter as a pivot, while it is connected to the piston with the clutch, taking advantage of the space between the rod and the inner wall of the control part.

Theory of Operation

The number of balls are reduced to two in the otherwise conventional ball clutch. The pushrod is swayed with these balls as a pivot. This eliminates the need for sheath tubing and the increase of the outer diameter of the quick-release mechanism can be avoided.

Example of Installation

An example of the installation is shown in FIG. 1 and FIG. 3. In the figures, 20 indicates the entire brake cylinder, 21 the cylinder body, 22 the piston, 23 the spring for spring braking, 24 the pushrod, 25 the clutch, and 26 is the operation part.

In the cylinder body 21, a cylindrical part 30 extends from the end wall 31. A hole 32a is drilled into an end part 32 and extends to the inner wall of the cylindrical part 30. An in/outlet opening 33a for compressed air is in the other end wall 33.

The piston 22 moves inside the cylinder body 21 between the end of the cylindrical part 30 and the end wall 33, dividing the cylinder body 21 into a spring room 34 and a compressed air room 35. The piston 22 has a cylindrical part 36, which extends from its center to the spring room side coaxially with the cylinder body 21. This part fits into the cylindrical part 30 of the cylinder body, being allowed to make translation motions along the axis.

The spring 23 for spring braking is housed in the spring room 34 of the cylinder body 21 between the end wall 31 and the piston 22, pushing the piston 22 to the compressed air room 35 side.

When the clutch is engaged, the one end of the pushrod 24 is positioned in the cylindrical part 36 of the piston 22, while the other end extends out of the cylinder body 21, being connected to the lever 1 as shown in FIG. 4.

The clutch 25 makes connections and disconnections of the movements of the piston 22 and the pushrod 24 along the axis. It consists of two balls 37 which are held in the cylindrical part 36 of the piston 22, a control part 38 which controls the position of the balls 37 and concaves 39 which are made in the pushrod 24 and relate to the balls 37. The two balls 37 are held in holes 40, which are drilled at the end of the cylindrical part 36 along its horizontal diameter, being allowed to move along the direction of the diameter. The control part 38 is a cylinder-shaped body and its one end fits the outside of the cylindrical part 36 where the balls are held. The other end reaches to the end of the cylinder body 21 through the cylinder-shaped part 30. It is held in the hole 32a of the end part 32 being allowed rotational motions as well as translational motions along the axis. A relative rotation to the piston 22 is also allowed. As shown in FIG. 3, concaves 41 are made on the inner wall of ball 37 position of the control part 38 at the positions which match the positions of the balls 37 when properly rotated, allowing the outer displacements of the balls 37. The inner diameter 38a of the control part 38 is determined to leave enough space for the outer diameter of the pushrod 24 to sway the pushrod 24. The concave 39 in the pushrod 24 is a ring-shaped channel and relates to the balls 37 as shown in FIG. 3. In FIG. 1, 42 is the second piston, which is housed in the cylindrical part 36 together with a spring 43. It can be moved to the inside positions of the balls 37 which are held in the cylindrical part 36. This is to prevent the balls 37 from dropping. A channel 44 is cut in the control part 38. It has a length corresponding to the stroke of the piston 22, keeping an operation part 26 connected at the cylinder end.

As shown in FIG. 2, the operation part 26 consists of a handle 45, a handle axis 46, and a catch 47. It is housed inside a housing 48 together with a spring 49. The housing 48 is built between the end wall 31 and the lid 32 of the cylinder body 21 allowing translational motions for the operation part 26 along the cross section perpendicular to the cylinder body 21 axis. The handle 45 is positioned at the external side of the cylinder body 21. The catch 47 is locked in the channel 44 of the control part 38 and the whole unit is held at the leftmost position under the pressure from the pushback spring 49. In this state, as shown in FIG. 3, the control part 38 locks the balls 37 in the concave 39 of the pushrod 24 with its small diameter part apart from the concaves 41 pressing the balls 37. By pulling the handle 45 from the cylinder body 21 in this state, the catch 47 rotates the control part 38 by a certain angle. As a result, the concaves 41 are positioned outside the balls 37 and the clutch 25 engaged is thus disengaged.

This brake cylinder 20 is used in the same way as explained with FIG. 4. The connection of the pushrod 24 at the lever 1 can be a simple pin connection with a horizontal pin. Normally, or in operation, compressed air is supplied to the compressed air room 35 and the piston 22 is moved to the left from the position shown in FIG. 1 against the action of the spring 23. Under the condition when the spring brake cylinder 20 is causing spring braking, compressed air in the compressed air room 35 is evacuated as shown in FIG. 1. Here, the clutch 25 is engaged and the pushrod 24 is pulled into the cylinder body 21. The lever 1 and the suspending rod 3 are swung as shown by simple dotted broken lines in FIG. 4 and the brake is activated. To release the spring brake manually, the handle 45 is pulled out at the side. As a result, the clutch 25 becomes disengaged as discussed above. The pushrod 24, being free from the constraint, does not transmit the action of the spring 23 to the lever 1. The lever 1 returns to the released position by the action of a spring in the brake cylinder BC. The pushrod 24 moves accordingly. Following the motion of the pushrod 24 (to the right [sic] in FIG. 1), the second piston 42 moves to the position of the balls 37, closing the holes 40 to prevent the balls 37 from dropping to the inside of the cylindrical part 36. The operation part 26 remains at nearly the same position after the handle 45 is released. This is the state where the brake is released by manual operation.

When compressed air is supplied to the cylinder room 35 of the cylinder body 21, the piston 22, in FIG. 1, moves to the left. The right end of the pushrod 24 goes into the cylindrical part 36, while pushing in the second piston 42 against the action of the spring 43. When the concaves 39 match with the holes 40, the operation part 26 under the action of the spring 49 and the control part 38 which in turn is under stress from the catch 47 move to let the balls 37 return to the concaves 39, causing the clutch 25 to engage.

When the spring brake is operated by supplying or evacuating air from the compressed air room 35 with the clutch 25 engaged, the connecting end of the pushrod 24 at the lever 1 makes vertical displacements as the lever 1 swings. When the clutch 25 is engaged, the pushrod 24 can be swayed in the vertical direction around the horizontal axis connecting the approximate centers of the two balls 37. This allows the displacements of the lever 1.

In FIG. 1, 50 is a ring made of rubber-like elastic material. This is used to hold the clutch side end of the pushrod 24 approximately coaxial with the cylindrical part 36 when the clutch is disengaged. This makes it easy to engage the clutch. 51 indicates a straight channel and 52 is a pin to prevent the piston 22 from rotating.

The Effect of the Invention

In the spring brake cylinder of the present invention, the number of the balls in the clutch is reduced to two, allowing to sway the pushrod with these balls as pivots. Since the clutch is designed to allow swaying the pushrod, separate components for swaying the pushrod are largely unnecessary. The clutch can be built with approximately the same diameter as in the conventional one. The linkage with the braking lever becomes simple.

We claim:

1. A spring brake cylinder assembly, said assembly comprising:
    (a) a body portion having a pair of axially-opposed end walls;
    (b) a piston positioned for reciprocal axial movement within said body portion, said piston having a face portion adjacent a first end wall of said body portion and a stem portion extending in an axial direction from an inner surface of said face portion of said piston;
    (c) a piston guide means engageable with said stem portion of said piston and a second end wall of said body portion for guiding said piston in an axial direction during reciprocal axial movement of said piston;
    (d) a brake spring caged between said inner surface of said face portion of said piston and said second end wall of said body portion to supply a predetermined braking force to said assembly;
    (e) a pushrod having a first end thereof extending coaxially into said body portion through a second end of said body portion;
    (f) a clutch means threadedly engaged with said stem portion and engageable with said pushrod adjacent said first end for making a connection and disconnection of said pushrod with said piston, thereby controlling their relative displacement in an axial direction;
    (g) a clutch control means engageable with said clutch means and said piston guide means for controlling said clutch means between an engaged and disengaged state, said clutch control means including an elongated hollow portion surrounding said pushrod and extending out of said second end of said body portion; and
    (h) a clutch operating means positioned adjacent said second end of said body portion and engageable with said clutch control means for manually releasing said assembly from a brake application.

2. A spring brake assembly, according to claim 1, wherein said pushrod is pivotally-connected to said clutch means.

3. A spring brake assembly, according to claim 2, wherein said assembly further includes a second piston positioned in a hollow portion of said stem portion of said piston.

4. A spring brake assembly, according to claim 1, wherein said assembly further includes a sensing means engaging said clutch control means for determining when said assembly is in a brake application and a brake release position.

* * * * *